United States Patent [19]

Goodarzi et al.

[11] Patent Number: 5,442,268
[45] Date of Patent: Aug. 15, 1995

[54] TORQUE OSCILLATION COMPENSATION USING TORQUE EMULATOR/OBSERVER FEEDBACK

[75] Inventors: Gholam D. Goodarzi, Torrance; Robert S. Wedeen, Manhattan Beach, both of Calif.

[73] Assignee: Hughes Aircraft Company, Los Angeles, Calif.

[21] Appl. No.: 61,658

[22] Filed: May 13, 1993

[51] Int. Cl.$^6$ .................................................. H02P 7/00
[52] U.S. Cl. .................................. 318/432; 318/434; 318/433; 318/610; 318/798
[58] Field of Search ............... 318/432, 610, 434, 433, 318/798

[56] References Cited

U.S. PATENT DOCUMENTS

| | | | |
|---|---|---|---|
| 3,965,407 | 6/1976 | Stoner | 318/432 |
| 4,412,291 | 10/1983 | Amberg et al. | 318/610 |
| 4,726,738 | 2/1988 | Nakamura et al. | 318/432 |

Primary Examiner—William M. Shoop, Jr.
Assistant Examiner—Karen Masih
Attorney, Agent, or Firm—L. A. Alkov; W. K. Denson-Low

[57] ABSTRACT

A torque oscillation compensation system and torque estimator that uses torque emulator/observer feedback derived from an electric vehicle motor drive train. The present torque oscillation compensation system is adapted for use with an electric vehicle comprising a source of torque command signals and an electric motor that is controlled by a power switching circuit. The power switching circuit is responsive to the torque command signals and provides pulse width modulated signals for driving the motor. The system comprises a torque estimator that is coupled to received pulse width modulated signals provided by the power switching circuit, and motor currents and speed, for providing estimated torque feedback signals derived therefrom. A summing device coupled to the source of of torque commands, the torque estimator, and to the power switching circuit, for combining the torque command signals with the estimated torque feedback signals to provide compensated input signals to the power switching circuit that control the motor torque and speed. The present invention provides a calculated estimate of motor power and torque in an electric drive train system. The power and torque are calculated by utilizing pulse width modulated signals of a motor controller and scaling the result according to the value of the battery voltage/power supply. This provides accurate operation over the entire battery voltage range without requiring voltage measurement at the motor terminals. The present technique provides for smooth vehicle handling over a broad range of speeds for every mode of propulsion operation. Single phase and three phase embodiments of the invention are disclosed.

2 Claims, 2 Drawing Sheets

TORQUE OSCILLATION COMPENSATION USING TORQUE EMULATOR/OBSERVER FEEDBACK

BACKGROUND

The present invention relates generally to torque oscillation compensation for electric vehicle motors, and more particularly, to a torque oscillation compensation system and torque estimator that uses torque emulator/observer feedback derived from an electric vehicle motor.

Electric drive train systems can exhibit torque pulsations. These torque pulsations can cause motor bearing and tire wear. The torque pulsations can also cause undesirable drive train/vehicle vibration. Prior art devices for use in stabilizing electric vehicles have attempted to implement vehicle stabilization using gyroscopic compensation. However, gyroscopic techniques have not yet proved to be feasible for use on electric vehicles.

Power and torque estimation has been done previously by use of watt-sense, watt meter, and/or in-line torque transducer methods. These implementations are not relatively cost effective and add additional volume and weight to the vehicle.

Accordingly, it is an objective of the present invention to provide for a torque oscillation compensation system and torque estimator that uses torque estimation feedback derived from an electric vehicle motor.

SUMMARY OF THE INVENTION

In order to provide for the above and other objectives, the present invention comprises a torque oscillation compensation system and torque estimator that uses torque emulator/observer feedback derived from an electric vehicle motor.

The present torque oscillation compensation system is adapted for use with an electric vehicle comprising a source of torque command signals and an electric motor that is controlled by an power switching circuit. The power switching circuit is responsive to the torque command signals and provides pulse width modulated signals for driving the motor. The system comprises a torque estimator that is coupled to received pulse width modulated signals provided by the power switching circuit, for providing estimated torque feedback signals derived therefrom. A summing device coupled to the source of of torque commands, the torque estimator, and to the power switching circuit, for combining the torque command signals with the estimated torque feedback signals to provide compensated input signals to the power switching circuit that control the motor.

In one embodiment, the torque estimator comprises processing and scaling means coupled to receive the pulse width modulated signals and a battery signal, for scaling the pulse width modulated signals in proportion to the battery signal to produce output signals that comprise a measure of the phase voltages applied to the motor. Multiplying and summing means are responsive to a predetermined current signal measured from the motor and to a signal indicative of the motor resistive parameter for producing an output signal corresponding to power. Multiplying means are coupled to the multiplying and summing means for multiplying the output signals therefrom to produce an output power signal indicative of the output power, P(t) of the motor. Dividing means are coupled to the multiplying means for dividing the output power signal by the speed of the electric vehicle to produce an output torque signal T(t) that is coupled to the summing device as the estimated torque feedback signal from the estimator circuit.

In a second embodiment, the torque estimator comprises processing and scaling means coupled to receive the pulse width modulated signals and a battery signal, for scaling the pulse width modulated signals in proportion to the battery signal to produce output signals that comprise predetermined line to line voltage signals applied to the motor. Multiplying and summing means are responsive to the line to line voltage signals and to a signal indicative of the motor parameters and to measured phase currents, for producing an output signal corresponding to power. Multiplying means are coupled to the multiplying and summing means for multiplying the output signals therefrom to produce an instantaneous power output signal. Summing means are coupled to the multiplying and summing means for summing the output signals therefrom to produce an output power signal indicative of the output power, P(t) of the motor. Dividing means are coupled to the multiplying means for dividing the output power signal by the speed of the electric vehicle to produce an output torque signal T(t) that is coupled to the summing device as the estimated torque feedback signal from the estimator circuit.

The present invention provides a calculated estimate of motor power and torque in an electric drive train system. The power and torque are calculated by utilizing TTL level pulse width modulated (PWM) signals of a motor controller and scaling the result according to the value of the battery voltage/power supply. This provides accurate operation over the entire battery voltage range without requiring voltage measurement at the motor terminals.

The present technique provides the smoothest vehicle handling over the broadest range of speed for every mode of propulsion operation while permitting quick acceleration response time without opening a feedback loop.

The present invention provides an accurate measure of motor power and torque without necessitating the use of a watt sensor. This results in lower cost. The present method may utilize a current sensor in a current control loop and does not require additional voltage or current sensing. The calculation for delivered power/torque accounts for the $I^2R$ power losses of the motor thereby improving the accuracy. All computation is done with low voltage, low power electronics, which is more cost effective than the watt sense and watt meter methods.

The present invention facilitates the implementation of torque compensation in electric vehicles to ensure ride comfort and vehicle durability. The present invention may also be used for failure mode detection of the motor. Its accurate measurement of shaft torque may be used as a control signal for any electrical/mechanical brake blending scheme used in the electric vehicle. All the benefits of the present invention are applicable to industrial adjustable speed drives and electric drive trains in general, especially in those applications where torque compensation is required and the cost for an in-line torque transducer is prohibitive.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
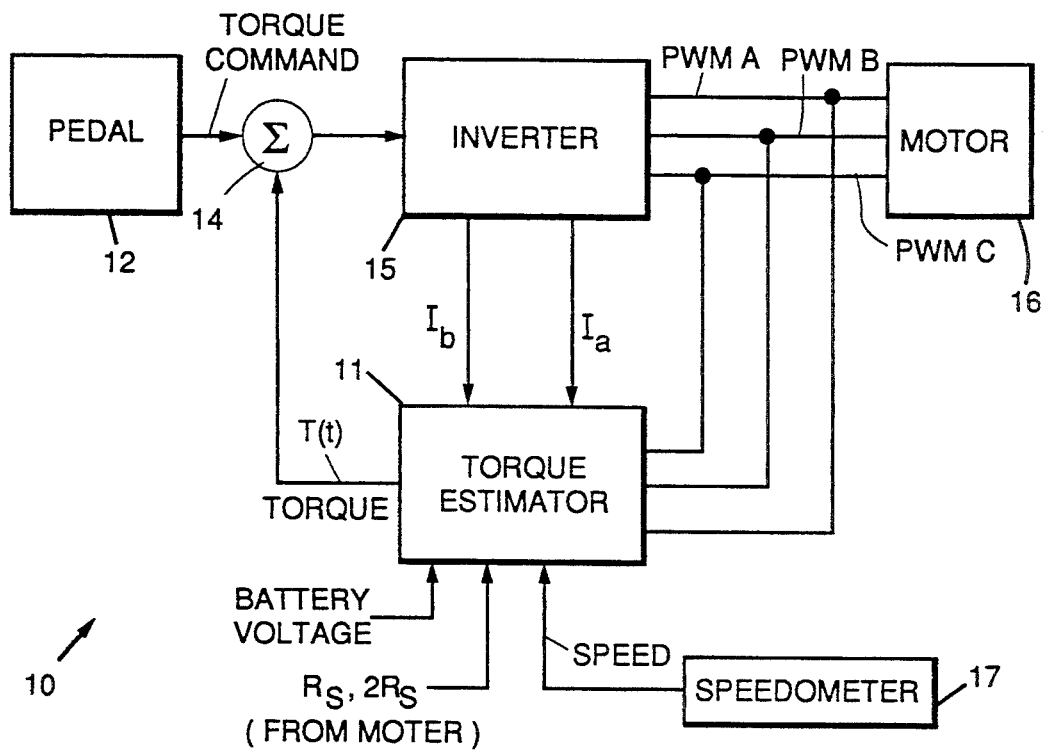
FIG. 1 illustrates a block diagram showing a torque oscillation compensation system that uses a torque estimator and torque emulator/observer feedback in accordance with the principles of the present invention.

Referring to the drawing figures, FIG. 1 illustrates a block diagram showing a torque oscillation compensation system 10 that uses a torque estimator 11 and torque emulator/observer feedback in accordance with the principles of the present invention. The torque oscillation compensation system 10 is comprised of a torque input source 12 such as is provided by an acceleration pedal of an electric vehicle 13, for example. The torque input source 12 is coupled by way of a summing device 14 to a switching device 15 such as an inverter, for example, that is coupled to an electric motor 16, such as an electric motor 16 of the electric vehicle 13, for example.

Pulse width modulated signals are coupled from the switching device 15 to the windings of the motor 16 to cause the motor 16 to generate torque in response to torque command signals provided by the accelerator pedal or input source 12. The pulse width modulated signals are fed back to the torque estimator 11, along with current signals ($I_a$, and optionally $I_b$) from the switching device 15. A battery voltage signal, a speed input signal derived from a speedometer 17 of the electric vehicle 13 and an input corresponding to the series winding resistance, $R_S$ of the motor 16 are also input to the torque estimator 11. The torque estimator 11 is adapted to process the applied signals to produce a torque feedback signal that is coupled to the summing device 14. The summing device 14 combines the torque feedback signals generated by the torque estimator 11 with the torque command signals derived from the accelerator pedal 12 to produce compensated command signals that drive the motor 16.

Figure 2:
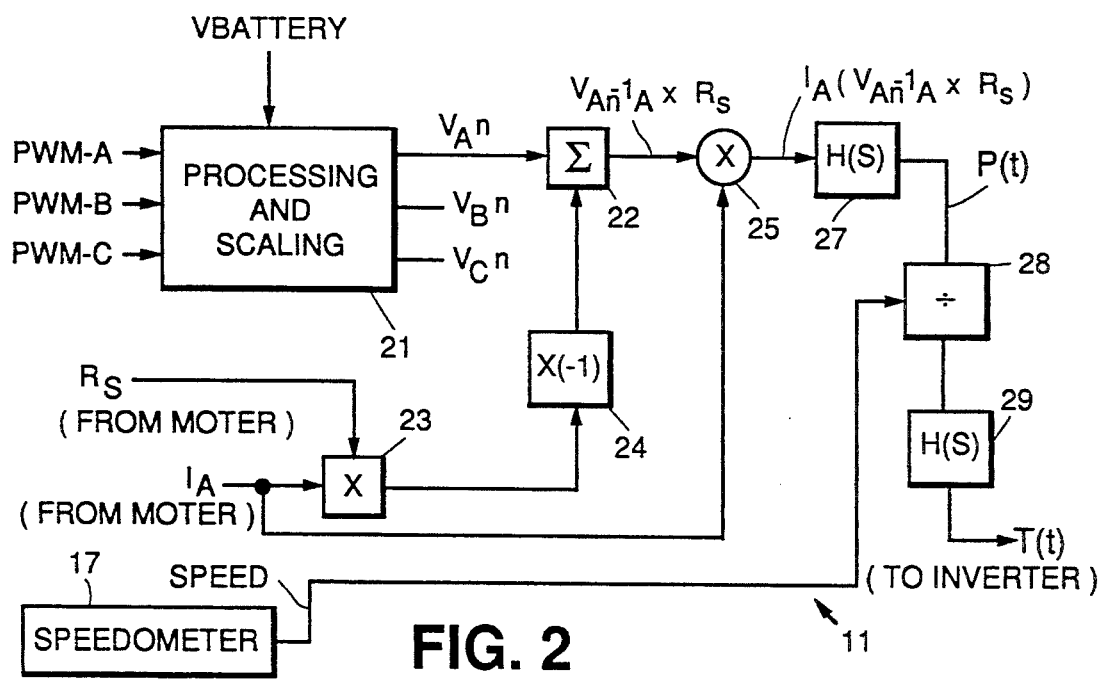
FIG. 2 illustrates a block diagram showing a single phase implementation of the torque estimator of FIG. 1.

Detailed embodiments of the torque estimator 11 will be described with reference to FIGS. 2 and 3 below. FIG. 2 illustrates a block diagram showing a single phase implementation of the torque estimator 11 of FIG. 1 More particularly, FIG. 2 depicts a single phase calculation circuit that comprises the torque estimator 11. The torque estimator 11 is comprised of a processing and scaling circuit 21 which is adapted to receive the pulse width modulated control signals (PWMA, PWM B, PWM C) and the battery voltage signal. Output signals ($V_An$, $V_Bn$ and $V_Cn$) from the processing and scaling circuit 21 comprise a measure of the phase voltages applied to the motor 16 with respect to the neutral point. Only the $V_An$ output signal is employed in the embodiment of FIG. 2. The $V_An$ output signal is coupled to one input of a summing device 22.

The phase A current signal $I_A$ from the motor winding is coupled by way of a multiplier which is adapted to multiply this signal with an input, $R_S$, corresponding to the equivalent resistance of the parameters of the motor 16. The output of the multiplier 23 is coupled by way of circuit that inverts the sign of the value of the output to a second input of the summing device 22. The output of the summing device is coupled to one input of a multiplier 25 whose other input is the phase A current signal $I_A$. The output of the multiplier 25 is representative of a transfer function (H(s)) 27 which produces an output power signal indicative of the output power, P(t) of the motor 16. The output power signal is coupled by way of a divider 28 which is adapted to divide the output power signal by the speed value to produce a signal that is representative of a second transfer function (H(s)) 29 which produces the output torque signal T(t) that is coupled to the summing device 14 as the feedback signal from the estimator circuit 11.

In operation, the pulse width modulated control signals (PWMA, PWM B, PWM C) are used to create real-time phase voltage waveforms for the motor 16. The amplitudes of the created waveforms are then scaled according to the battery voltage, derived from the battery voltage signal. This is performed in a processing and scaling circuit 21 of the torque estimator 11 shown in FIG. 2. The outputs from the processing and scaling circuit 21 are a measure of the phase voltages applied to the motor 16 with respect to the neutral point ($V_An$, $V_Bn$ and $V_Cn$). For the single phase embodiment shown in FIG. 2, only phase A signals are used. An input, $R_S$, corresponding to the equivalent resistance of the motor parameter is multiplied by an input that corresponds to the sensed phase current $I_A$ in the motor 16. The product of $R_S I_A$ is subtracted from $V_An$ to yield $V_An - I_A R_S$. This quantity is then multiplied by $I_A$ to yield the delivered power, P(t). P(t) is then divided by the motor speed value derived from the speedometer 17 which results in a delivered motor torque corresponding to T(t).

Figure 3:
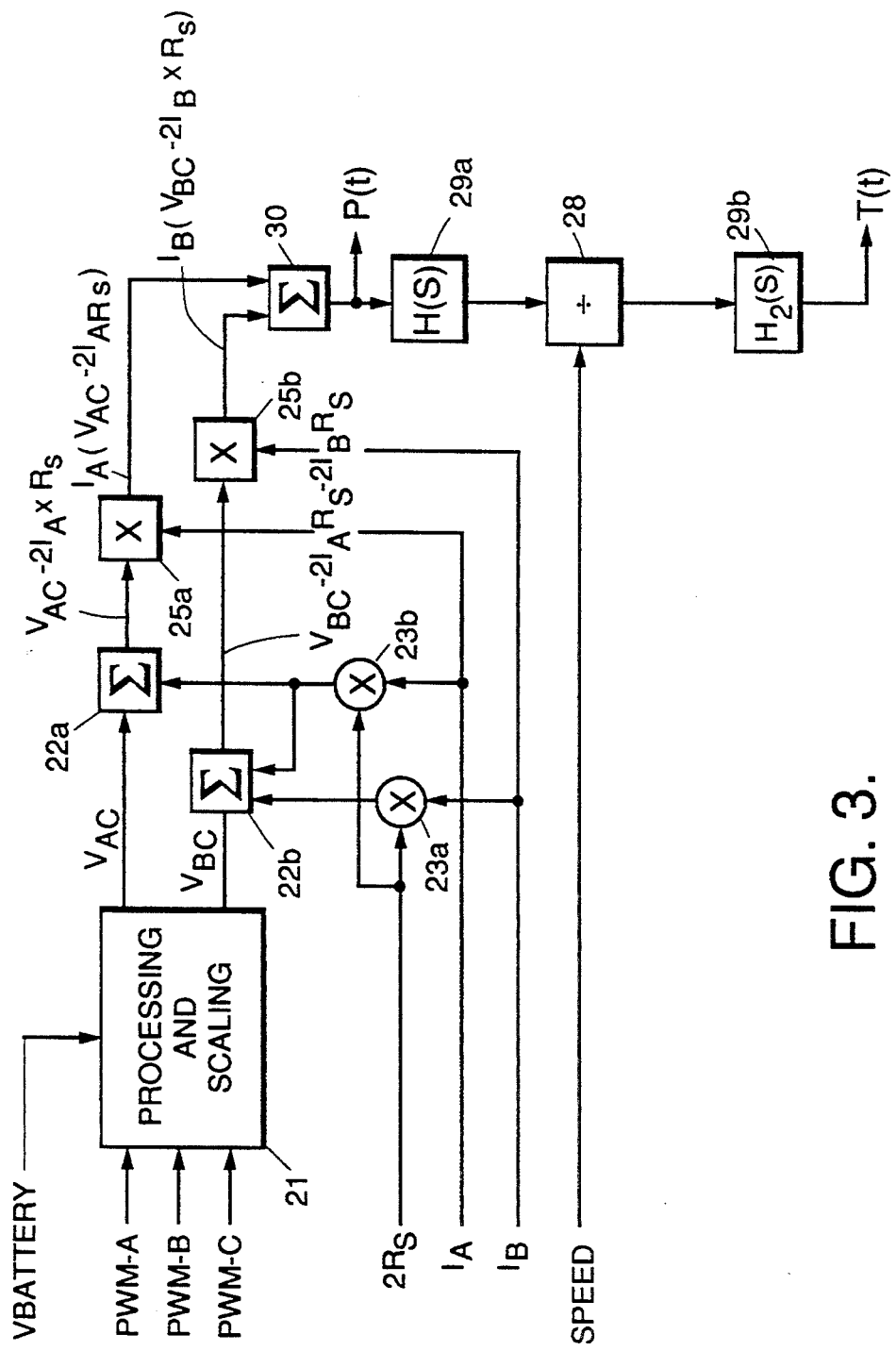
FIG. 3 illustrates a block diagram showing a three phase implementation of the torque estimator of FIG. 1.

FIG. 3 illustrates a block diagram showing a three phase implementation of the torque estimator 11 of FIG. 1. In FIG. 3, the line to line voltages $V_{AC}$ and $V_{BC}$ are derived from the pulse width modulated control signals in the processing and scaling circuit 21, using the battery voltage signal, similar to that used in the torque estimator 11 FIG. 2.

The torque estimator 11 of FIG. 3 is comprised of the processing and scaling circuit 21 which is adapted to receive the pulse width modulated control signals (PWMA, PWM B, PWM C) and the battery voltage signal. The line to line voltages $V_{AC}$ and $V_{BC}$ are provided as output signals from the processing and scaling circuit 21. These line to line voltages $V_{AC}$ and $V_{BC}$ are respectively coupled to first and second summing devices 22a, 22b.

The phase A and phase B current signals $I_A$ $I_B$ from the motor windings are coupled by way of first and second multipliers 23a, 23b which are adapted to multiply these signals with an input, $2R_S$, corresponding to twice the value of the equivalent resistance of the parameters of the motor 16. The output of the multipliers 23a, 23b are coupled to second inputs of the summing devices 22a, 22b. The output of the summing devices are coupled to respective multipliers 25a, 25b whose other inputs are the phase A and phase B current signals $I_A$ $I_B$. The output of the multipliers 25a, 25b are coupled to a Summing device 30 whose output is an output power signal P(t) indicative of the output power of the motor 16. The output of the summing device 30 is representative of a first transfer function (H(S)) 29a. The output power signal P(t) is coupled by way of a divider 28 which is adapted to divide the output power signal by the speed value to produce a signal that is representative of a second transfer function (H$_2$(s)) 29b which produces the output torque signal T(t) that is coupled to the summing device 14 as the feedback signal from the estimator circuit 11.

In operation, the equivalent resistance (R$_S$) of the motor parameters, phase A current (I$_A$), phase B current (I$_B$) and the motor speed are multiplied and summed in the proper combination to obtain a measure of the output power, P(t)=I$_A$ ( I$_A$×R$_S$)+I$_B$ (V$_{BC}$−2(I$_B$)R−2I$_A$(R$_S$)). This signal may be filtered and/or averaged over any desired time period as required for the given application. The filtering and/or averaging are accomplished by way of the transfer functions 29a, 29b produced by the estimator 11. The torque T(t) is then calculated by dividing P(t) by the motor speed. The three phase embodiment of FIG. 3 eliminates sine-squared components of the power and/or torque spectrum, simplifying torque feedback filtering requirements.

Thus there has been described a new and improved torque oscillation compensation system and torque estimator that uses torque emulator/observer feedback derived from an electric vehicle motor. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A torque oscillation compensation system for use with an electric vehicle comprising a source of torque command signals and an electric motor that is controlled by a power switching circuit that is responsive to the torque command signals and which provides pulse width modulated signals for driving the motor, said system comprising:

a torque estimator coupled to receive pulse width modulated signals provided by the power switching circuit for providing estimated torque feedback signals derived therefrom, wherein said torque estimator comprises:

(i) processing and scaling means coupled to receive the pulse width modulated signals and a battery signal, for scaling the pulse width modulated signals in proportion to the battery signal to produce output signals that comprise a measure of the phase voltages applied to the motor, (ii) multiplying and summing means responsive to a measured current signal from the motor and to a signal indicative of the equivalent resistance of the motor for producing an output signal corresponding to a first transfer function, (iii) multiplying means coupled to the multiplying and summing means for multiplying the output signals therefrom to produce an output power signal indicative of the output power P(t) of the motor, and (iv) dividing means coupled to the multiplying means for dividing the output power signal by the speed of the electric vehicle to produce an output torque signal T(t) that is coupled to the summing device as the estimated torque feedback signal from the estimator circuit; and a summing device coupled to the source of torque command signals, the torque estimator, and to the power switching circuit, for combining the torque command signals with the estimated torque feedback signals to provide compensated input signals to the power switching circuit that controls the motor.

2. A torque oscillation compensation system for use with an electric vehicle comprising a source of torque command signals and an electric motor that is controlled by a power switching circuit that is responsive to the torque command signals and which provides pulse width modulated signals for driving the motor, said system comprising:

a torque estimator coupled to receive pulse width modulated signals provided by the power switching circuit for providing estimated torque feedback signals derived therefrom, wherein the torque estimator comprises:

(i) processing and scaling means coupled to receive the pulse width modulated signals and a battery signal, for scaling the pulse width modulated signals in proportion to the battery signal to produce output signals that comprise predetermined line to line voltage signals applied to the motor, (ii) multiplying and summing means responsive to the line to line voltage signals and to a signal indicative of the equivalent resistance of the motor and to measured phase currents, for producing an output signal corresponding to first transfer function representative of instantaneous power, (iii) multiplying means coupled to the multiplying and summing means for multiplying the output signals therefrom to produce an output power signal indicative of a second transfer funciton representative of power, (iv) summing means coupled to the multiplying and summing means for summing the output signals therefrom to produce an output power signal indicative of the output power P(t) of the motor, and (v) dividing means coupled to the multiplying means for dividing the outut power signal by the speed of the electric vehicle to produce an output torque signal T(t) that is coupled to the summing device as the estimated torque feedback signal from the estimator circuit; and a summing device coupled to the source of torque command signals, the torque estimator, and to the power switching circuit, for combining the torque command signals with the estimated torque feedback signals to provide compensated input signals to the power switching circuit that controls the motor.

* * * * *